UNITED STATES PATENT OFFICE.

THOMAS SHEEHAN, OF DUNKIRK, NEW YORK.

IMPROVED METHOD OF CONVERTING IRON INTO STEEL.

Specification forming part of Letters Patent No. 29,919, dated September 4, 1860.

*To all whom it may concern:*

Be it known that I, THOMAS SHEEHAN, of Dunkirk, in the county of Chautauqua, in the State of New York, have invented a new and useful Composition of Matter for Converting Wrought-Iron Partially into Steel, and which I have denominated "Sheehan's Compound for Steelifying Wrought-Iron," the term "to steelify," and analogously its inflections, being used with the same signification as the term "to convert partially into steel" is; and I do hereby declare that the following is a full and exact description of my invention, and of the manner of making, compounding, and using the same.

My said invention consists of two parts, the first being a liquid composition and the second a compound of flour and said liquid composition. The liquid composition is made in the following manner; I first take one (1) part of white vitriol or sulphate of zinc, one and one-sixth ($1\frac{1}{6}$) part of saltpeter, nine (9) parts of slaked lime, seventeen (17) parts of culinary salt, forty-three and three-fourths ($43\frac{3}{4}$) parts of scrap-leather, and add them to five hundred and sixty-five (565) parts of strong lye, thoroughly mixing these ingredients by stirring or otherwise agitating them. I then take four (4) parts of oak, of birch, or of hemlock bark, finely ground, or, what would be better, shredded, like "fine-cut tobacco," and spreading it over the bottom of a shallow vessel saturate and barely cover it with a dilute alcohol made by adding to any quantity of the best commercial alcohol an equal volume of rain or other soft water. After allowing the bark thus treated to steep for at least three hours, with occasional stirring, I add it, with its saturating-liquid, to the mixture first made, and again stirring I pour the whole into a vessel suitable for the operation of boiling, if that in which the ingredients have been mixed be not such. An old cast-iron pot answers for both purposes. Finally, having brought the mass to a state of gentle ebullition I let it boil slowly for one hour more and then remove it from the fire, the process of making the liquid composition being now completed. The boiling, however, may be allowed to proceed very briskly instead of slowly; but in such case the composition is not allowed to remain on the fire for more than half this time after reaching the boiling-point, and generally the stronger the ebullition the sooner must the composition be removed from the fire. This liquid composition should not be employed in the making of my steelifying compound till it has stood for at least twenty-four hours after its removal from the fire. It may then be turned into a barrel or other receptacle for such purpose, or set away in barrels or bottled for future use or for the market. From some experience in making and using it I am convinced it improves with age, and that the longer it is kept the better it will work. It does not appear to be injuriously affected by changes of temperature.

The lye should be of such a strength as to have a specific gravity of about 1.164, or should weigh about nine thousand six hundred and ninety-six pounds avoirdupois weight per wine gallon. In the absence of a hydrometer and scales and weights an egg may be used to test with. If it float horizontally with its side about one-fourth of an inch above the surface of the fluid, the strength of the lye may be assumed to approximate this standard sufficiently for practical purposes. The lye should be made from the ashes of hard wood; but when necessarily made from those of soft wood it must be concentrated by boiling down till the required strength is obtained. In the absence of wood-ashes of every kind a lye of the strength here indicated may be made from the crude potash of commerce. The substances added to the lye and dilute alcohol should be perfectly dry before they are weighed. The scrap-leather to be preferred is refuse cuttings of side and sole leather. It should be minced, ground small, shredded, if possible, or at least softened by pounding before it is added to the lye.

It is to be particularly observed that the proportional parts of the ingredients herein specified are to be taken by weight, except only in the case of alcohol and water, the proportions of which are taken by volume.

The compound for converting wrought-iron partially into steel, or, as I more briefly term it, for "steelifying wrought-iron," is a paste made of wheat or rye flour and the above-described liquid composition. The flour employed may be of the most inferior quality. It may even be damaged. The iron to be steelified is coated with this compound and submitted to the action of heat till the conversion takes place in a manner that will be hereinafter more particularly described. The thickness of this coating will depend upon that of the iron, being one-fourth ($\frac{1}{4}$) of an inch for iron having a thickness varying from three-sixteenths ($\frac{3}{16}$) to one-half ($\frac{1}{2}$) of an inch, and being one-half ($\frac{1}{2}$) of an inch for all iron of greater thickness. Hence, in preparing the compound to steelify iron of the first or the variable thickness, I give it such a consistence that the iron when dipped in it shall retain a coating one-fourth ($\frac{1}{4}$) of an inch thick averaged; but when preparing it for the steelifying of iron more than one-half ($\frac{1}{2}$) of an inch in thickness I give it such a consistence that the iron when dipped in it shall retain a coating one-half ($\frac{1}{2}$) of an inch thick averaged. It would be better, however, when iron is to have a coating of a half ($\frac{1}{2}$) inch thick, to make the compound of such a consistence as to give by dipping a coating not of a half ($\frac{1}{2}$) inch, but of one-fourth ($\frac{1}{4}$) of an inch thick, and, when practicable, to give the iron a coating of this a half ($\frac{1}{2}$) inch deep, as the coating in this case will be much more effective than if made of a compound having a consistence giving at once a half ($\frac{1}{2}$) inch of thickness.

To make the steelifying compound I place before me, within reach, one bucket containing rather more flour than will be necessary to make the quantity of paste sufficient to coat the iron to be steelified, another bucket containing more of the liquid composition than will be required to make with this flour a paste of the proper consistence, and another and empty bucket in which to make the paste, arranging them in any order the most convenient for manipulating. Then, to insure thorough and uniform incorporation, as well as to obtain proper consistence, I make the compound by working up the ingredients by portions instead of mixing the whole of them at once. Thus, having poured a part of the flour into the empty bucket, I alternately stir and add liquid till I get a paste of the desired consistence. To this I add a portion of flour equal to that poured into the bucket, and after thoroughly mixing the whole temper the mass, as before, by alternate stirrings and additions of liquid. I again add an equal portion of flour to the paste, mix and temper, and so proceed till the requisite quantity of the compound is made. When large quantities of compound of either consistence are to be made and the same kind of flour is to be used in all a great saving of time, if not a more constant product, would result by finding at the outset the relative weight of flour and of lye required to make the compound of the desired consistence. The absolute weights of these materials could then be easily determined for any quantity of the compound.

Should a surplus of the compound left after a coating operation become dry, it may be restored to the pasty condition by working it up with the liquid composition, its strength being improved, rather than deteriorated, by the process.

To steelify a heavy piece of wrought-iron—such as a piece of the link-motion of a locomotive-engine—a wrought-iron box of sufficient strength is first to be provided. Its length and breadth should be such that it will afford sufficient space about the coated link, when placed within it, for a proper packing of bones and leather, and its depth should exceed by at least three inches the greatest thickness of said link. Its lid, made of the same metal, should fit close to its seat, so as to exclude flame. An even and a compact layer of ground bones and scrap-leather fully one-half of an inch thick should be spread over the bottom of the box, and upon this a uniform layer of the compound of rather more than the same thickness. The uncoated link is then so laid upon the compound that its sides and ends may be respectively equidistant from the sides and ends of the box, and every part of it not embedded in the layer is covered with a coating of the compound at least one-half of an inch thick; or the link, after receiving a full coating of this thickness, may be laid directly on the bones and leather, omitting the layer of the compound on the latter and carefully coating such parts of the metal as may be left bare by handling. In either case ground bones and leather alone or mixed up with the compound must be poured into the spaces around the link till they reach the level of the uppermost coating of the link, when another uniform layer of bones and leather one inch thick must be spread over the whole. Liquid composition must now be sprinkled rather freely over this covering-layer, so as to settle it down somewhat. The lid is then placed on the box, and if provided with a small hole for the escape of vapor or steam it is luted close by covering the seam of the joint with clay or any other suitable substance. If it has no such vent, but fits close, the lute may be omitted. The box being placed in a furnace, or in an open fire of raw wood made on a smith's forge, is allowed to remain until the link is gradually brought up to a bright cherry-red heat by a proper arrangement of the fire—a fact to be ascertained by an inspection of the iron after the removal of a portion of the covering-layer of bones, &c.—when, the steelifying being completed, it is removed to a hardening-bath made by adding one gallon of culinary salt to every six (6) gallons of water, rain or other soft water to be preferred when to be had. After the link is hardened by immersion in this bath it is cleaned, if necessary, with a piece of fine grindstone and water, when it will present a surface of silvery luster, without the least appearance of flaw, blister, or other blemish. This cleaning, however, is only required in the case of an article of iron that has been steelified before finishing, or in the rough, for generally the compound, after the completion of the process, will leave the surface of the finished or polished article bright and clean.

The steelifying of small articles of iron is managed nearly in the same way, only several may be put in one and the same box. If there were some half-dozen gibs and keys to undergo this process, the box, somewhat longer than the articles, would be made sufficiently wide and deep to permit them to be arranged in layers of three, for instance. The bottom of the box would be covered with a layer of bones and leather, as in the preceding case, then on this three gibs or keys properly coated would be laid about half of an inch distant from each other and from the sides of the box, the intervals between them being filled with bones and leather. Over this layer of articles a layer of bone and leather would be spread, on which, again, another layer of coated gibs or keys would be laid, as just described, and these finally covered with another layer of bones and leather, which should be sprinkled with the liquid composition.

The rest of the process is carried out as in the preceding example. The coating or covering with the steelifying compound heavy or thick and light or thin pieces of iron may be effected either by dipping or by rolling the iron in the compound or by applying the paste with a spatula, but in either case observing that the coat of compound have the thickness required by that of the iron to which it is applied, as hereinbefore explained.

My experiments do not warrant any positive statement as to the precise depth of the coat of steel formed on the iron by using my compound; but the two following from many results of the same kind may throw some light on this point: A flat rod of common English iron three-sixteenths of an inch thick, having a coat one-quarter of an inch, was steelified one-sixteenth of an inch deep in two hours; a bar of the same kind of iron one and one-eighth inch square, having a coat one-half an inch, was steelified one-eighth of an inch deep in five hours. From this it may be inferred that the depth depends on the time required to attain a bright cherry-red heat and on the thickness of the coat of compound together; but whatever may be the depth it may be increased to any extent by repeating the process. In all cases it will be found that the thickness of the steel envelope is remarkably uniform, and that steelified iron may be softened and, without a repetition of the process, retempered, like ordinary steels.

The proportion of the ingredients, the consistence of the compound paste, and the thickness of coating herein specified are those that give the best results with Russian and common English and American irons, but require some modifications for some others—as the Swedish, for a flat bar of this three-sixteenths of an inch thick coated one-quarter of an inch was entirely converted into steel in two hours. Hence I wish it to be understood that I do not limit myself to the precise proportions of ingredients for making the liquid composition and the steelifying compound, nor to the precise thickness of the coating of the compound as herein specified.

Having thus fully described the nature of my invention and the manner of making and using the same, I claim as follows:

1. The liquid composition consisting of the ingredients used, compounded in, or in about, the proportions herein specified and described.

2. The compound for steelifying wrought-iron, made of the liquid composition and flour, in the manner and for the purposes herein set forth.

THOMAS SHEEHAN.

Witnesses:
   THOS. NORFLET,
   WM. H. GOODS.